(12) United States Patent
    Wong (10) Patent No.: US 8,715,550 B2
(45) Date of Patent: May 6, 2014

(54) METHODS OF MANUFACTURING FORMALDEHYDE-FREE MOLDED PRODUCTS AND RELATED PARTS

(76) Inventor: Teck Tin Wong, Hillcrest Arcadia (SG)

( * ) Notice: Subject to any disclaimer, the term of this patent is extended or adjusted under 35 U.S.C. 154(b) by 0 days.

(21) Appl. No.: 13/441,557

(22) Filed: Apr. 6, 2012

(65) Prior Publication Data
    US 2012/0286442 A1    Nov. 15, 2012

Related U.S. Application Data

(62) Division of application No. 12/671,649, filed as application No. PCT/SG2008/000265 on Jul. 21, 2008, now abandoned.

(51) Int. Cl.
    *B27N 3/04*    (2006.01)
(52) U.S. Cl.
    USPC .......................... 264/122; 264/319; 106/38.2
(58) Field of Classification Search
    CPC ............. B27N 1/003; B27N 3/04; B27N 3/08
    USPC .................................................. 102/38.2, 201
    See application file for complete search history.

(56) References Cited

U.S. PATENT DOCUMENTS

| | | | | |
|---|---|---|---|---|
| 4,359,507 A | * | 11/1982 | Gaul et al. | 428/425.1 |
| 4,999,240 A | * | 3/1991 | Brotz | 442/376 |
| 5,507,988 A | * | 4/1996 | Eagan et al. | 264/122 |
| 6,130,308 A | * | 10/2000 | Rink et al. | 528/75 |
| 2006/0142433 A1 | * | 6/2006 | Rivers et al. | 524/17 |

FOREIGN PATENT DOCUMENTS

| | | |
|---|---|---|
| EP | 0765738 | 4/1997 |
| EP | 1207740 | 12/2006 |
| WO | 0220665 | 3/2002 |
| WO | 2005120787 | 12/2005 |
| WO | 2005120967 | 12/2005 |

\* cited by examiner

*Primary Examiner* — Yogendra Gupta
*Assistant Examiner* — Alison Hindenlang
(74) *Attorney, Agent, or Firm* — Carlos R. Villamar; The Villamar Firm PLLC (57) ABSTRACT

The present invention provides a moldable mixture containing large portion of agricultural fibers and small portion of a binding agent and a flow-promoting filler material. The moldable mixture is substantially free of formaldehyde, with low moisture content and high draw ratio. The present invention also provides methods of manufacturing molded products and related parts, based on the claimed moldable mixture. Molded products (830) and related parts such as runner (810) and plank (820) with light weight, high density and more complex profile are manufactured by the claimed methods including steps of providing required materials for a moldable mixture, mixing the provided materials to form a moldable mixture, shaking the moldable mixture in preparing for compression molding and compression molding the moldable mixture to form molded products and related parts.

11 Claims, 8 Drawing Sheets

METHODS OF MANUFACTURING FORMALDEHYDE-FREE MOLDED PRODUCTS AND RELATED PARTS

TECHNICAL FIELD

The present invention relates to packaging materials and related methods for construction of the same. With greater particularity the present invention relates to moldable materials for use in the construction of pallets and methods of producing the same. With even greater particularity the present invention relates to moldable materials and related methods of using the same for construction of pallets which are substantially free of formaldehyde.

BACKGROUND ART

A pallet is a flat transport structure made of either wood, plastic, paper, metal and composite material that can support a variety of goods in a stable fashion while being lifted by any mobile pallet lifting device. The purpose of the pallet is to improve storage and product distribution efficiency and to protect the product. Pallet serves equally as the interface between the packaged product and the roughness of the product distribution environment which includes many different vibrations and shocks during truck, rail or air transportation.

Today, it is estimated that there are more than one billion new pallets that are produced yearly worldwide. It is estimated that more than 93% of the pallets produced are made of wood. Due to the use of wood as a source, the consumption of wood for making wood pallets is now recognized as part of the deforestation which is a major contributory factor to global warming. The compressed wood pallet that uses Melamine Urea Formaldehyde (MUF) or Urea Formaldehyde (UF) as the binder may cause health hazards according to the International Agency for Research of Cancer. Other than the afore-mentioned environmental problems, wood pallets also carry risk of introduction and/or spread of quarantine pests. New guidelines named as "International Standards for Regulating Wood Packaging Material in International Trade" (ISPM 15) are set out to govern the use of wood packaging materials. Under the ISPM 15 guidelines, all wood pallets need to be either heat treated or fumigated so as to ensure that no living pests are being transported from one country to another. Unfortunately, not all types of wood can be heat treated and chemicals, especially methyl bromide, used for fumigation appears to cause health hazards.

Due to the afore-mentioned disadvantages of using wood packaging materials, alternative materials such as plastics, metal, composite materials have been used. However, these packaging materials are neither environmental friendly nor cost-effective. For example, the plastic pallet takes more than 100 years to be degraded. Plastic and metal pallets are also relatively more costly and heavier. As oil prices reach the new highs, it is no longer cost-effective to use plastic and metal pallets, especially for one-way transportation of goods by air as charges are more likely directed to the weight of packed cargo, including the weight of pallet.

Conventional open-molding process is mainly used for manufacturing of flat sheet or board. As there is no built-up wall along the parameter, the molded product usually requires trimming and has relatively low density. Composite materials used in such process only require the addition of low content binder without the use of filler material or flow promoter. However, the main disadvantages of open-molded product are that the profile of the molded product is limited to the flat sheet and usually with a standard size. The wastages from trimming the four edges are also relatively high. It is not cost-effective in terms of material utilization.

Comparing with open-molding process, products produced by typical close-molding process have relatively higher density and can result in a more complex profile of the molded product. There is also no material wastage as no trimming of edges is required. However, most of the conventional close-molded products still relies on the use of metals and plastics which are more costly and environmental unfriendly. Alternative methods as described in patent publications WO2005/120787 and WO/2005/120967 have used wood fibers as a basic material to form moldable mixture. These references use relatively high percentage of wood fibers and use high percentage of Melamine Urea Formaldehyde as a liquid binder in their moldable mixture for molding their product. The liquid binder used in their moldable mixture carries formaldehyde to the molded product which is known to be harmful to the environment and probably harmful to our health. As a result, expensive exhaust systems are required to eliminate the formaldehyde during processing under a controlled environment.

The moldable mixture used in WO 2005/120787 and WO 2005/120967 also require the use of soya extract as a de-molding agent for ease of removing the molded product from the mold, and the use of palm fibers as an impact modifier for providing a cushioning effect for the molded product. The moisture content of the moldable mixture according to these methods is also relatively high because liquid binder is used. The products molded with wood fiber usually have lower impact and bending strength because wood fibers are relatively brittle and difficult to flow. In order to produce product with the desired properties such as high impact and bending strength, high density, and more importantly the desired profile, additional additives are used by these approaches to form the moldable mixture, and significant amount of liquid is also needed to facilitate the flow of the moldable mixture in the mold so as to form the desired profile and strength.

The disadvantages of using large amount of liquid binder to facilitate the flow of the moldable mixture in the molding process include: a) the high content of moisture vaporized during the molding process increases the pressure in the molding mixture which in turn increases the risk of the molded product being delaminated when the mold is opened because of the sudden release of pressure; b) the high water content in the liquid binder may dilute the added adhesive to certain extend resulting in longer molding time and therefore hardener which is for the acceleration of the hardening process is needed to ensure that the molded product is fully cured in the mold before it can be ejected out; c) the high pressure generated through the moisture/liquid vaporizing process may cause mold explosion if the pressure is not released in time. Pressure vents are therefore incorporated in the mold design which is tedious and expensive; and d) the molded product produced with such process is usually prompt to fungus attack, and has relatively high shrinkage and they warp easily due to high moisture content in the molded product; e) an additional ironing process by opening and closing the mold repeatedly to allow the excess moisture/steam to escape during molding process is needed so as to give sufficient time for the molded product to cure in the mold before ejecting it out.

In addition, the methods disclosed in Patent Publications WO 2005/120787 and WO 2005/120967 use ammonium chloride as a hardener to harden the molded product in the mold before it is ejected out because the moldable mixture had high moisture content. Hardening agent is easily hardened in high temperature and as such high temperature has to be avoided in the conventional molding process. On top of this, soya extract is also used as the de-molding agent to facilitate the ejection process. The main disadvantage of using soya extract is that the soya extract may not facilitate the bonding among wood cells of the wood fibers. More liquid binder is therefore needed to provide a desirable bonding property. However, the more the binder is used, the more the formaldehyde is emitted during the molding process.

Another alternative way to achieve a desirable molded product is to use a moldable mixture with low moisture content. However, it is difficult to mold a product with a complex profile if the moldable mixture contains a material which is difficult to flow in the molding cavity with low moisture content. In addition, the lower is the moisture content, the lower is the drawing ratio. The drawing ratio is an index of how the moldable mixture can be flown in an enclosed mold.

In view of the afore-mentioned problems associated with the use of wood pallets, be it environmentally, health or cost, and all other alternate pallets available in the market, in one way or another has its own shortcomings. It is therefore primarily important to come out with a new moldable mixture which is free of formaldehyde and low in moisture content. Methods of manufacturing molded products and related parts which are cost-effective, safe and capable of producing high density, light weight and more complex molded products are also important.

SUMMARY OF INVENTION

The first aspect of the present invention is to provide a moldable mixture containing at least one kind of agricultural fiber, a binding agent that is substantially free of formaldehyde and a flow-promoting filler material but in the absence of hardening agent, impact modifier, co-solvent and de-molding agent. The agricultural fiber may be rape straw, rice stalk or a combination of both which contributes a large portion in the mixture. The percentage weight of the agricultural fiber is between 85%-95% to the total weight of the moldable mixture. The agricultural fiber of the moldable mixture has a moisture content of less than 8% by weight to the moldable mixture. More preferably, the moisture content of such agricultural fiber is less than 5% by weight to the moldable mixture. The small portion of the moldable mixture includes a substantially low percentage of binding agent which may be selected from a formaldehyde-free class of chemical such as Diisocyanate-diphenylmethane (MDI) or any soy-based binding agent. The percentage weight of the binding agent in a preferred embodiment is not more than 5% to the total weight of the moldable mixture. Such class of chemical can be mixed well with the agricultural fiber and improving the packing of agricultural fiber in the moldable mixture. A substantially low percentage of flow promoter which is also used as the filler material is also added such as wheat flour to mix with agricultural fibers to promote the flow of the moldable mixture, and at the same time fill up the empty space between the fiber cells during molding. The percentage weight of the flow-promoting filler material in a preferred embodiment is less than 10% by weight to the moldable mixture. The molded product with the use of flow-promoting filler material is relatively much compact and it is not prompt to absorb moisture from air freely and hence it is less prompt to warp, shrinkage and fungus attack. One distinguishing feature of the present invention is the absence of hardener, impact modifier, de-molding agent and co-solvent in the moldable mixture. The moisture content of the moldable mixture of the present invention is also relatively low because not more than 5% by weight of the high viscosity binder is used and the nature of such binder is low in moisture content. The components for the moldable mixture of the present invention are easily accessible, simple and cost-effective. In summary, the key features of the moldable mixture in the present invention are:

Free of Formaldehyde. Not more than 5% by weight of high viscosity binder, especially Diisocyanate-diphenylmethane (MDI) or any soy-based binding agent, is added as a component of the moldable mixture. The use of this high viscosity binder can keep the total moisture content of the molding mixture relatively low.

Wheat Flour is used instead of Tapioca Flour. This is mainly due to the fact that Tapioca Flour is much costly and it is gluten-free. As tapioca flour is gluten-free, products produced are therefore much brittle. On the other hand, wheat flour contains proteins called gluten. When molded products made with wheat flour is kneaded, the gluten molecules cross-link to form a sub-microscopic network that gives the product an elastic structure. This allows the retention of gas bubbles in an intact structure, resulting in an aerated final product with a ductile texture, and the product produced is therefore less brittle.

No de-molding agent material such as soya extract and hardener such as ammonia chloride are added to form the moldable mixture. The mold is coated with a layer of commercially available de-molding material and with the hydraulic ejection system incorporated in the mold and press design, and also due to the fact that the moisture content of the moldable mixture is relative low (as no more than 5 wt % of high viscosity binder, especially MDI or any soy-based binding agent is used), the molded product can be ejected out from the mold easily. No hardener such as ammonium chloride and de-molding agent such as soya extract are added to form moldable mixture. The molded product takes a much shorter time to cure in the mold due to less moisture content. In addition, no co-solvent such as alcohol is added to facilitate the curing process in the present invention, whereas co-solvent is used to accelerate the vaporization process of the moisture in the moldable mixture when the moldable mixture used is in high content of moisture.

Relatively Light weight. Agricultural fibers such as rape straw and/or rice stalk are used as the basic materials. These materials are almost one-third lighter than wood or wood related materials.

The second aspect of the present invention relates to methods of manufacturing molded products and related parts including steps of providing the materials agricultural fibers, a binding agent and a flow-promoting filler material for a moldable mixture, mixing the provided materials to form a moldable mixture, shaking the moldable mixture in preparing for compression molding and compression molding the moldable mixture to form a molded product.

Distinguishing features of the present invention from conventional molding process include a different composition and moisture content of the moldable mixture during the providing step, a shorter and more simple mixing and molding cycle during the mixing step, a more evenly distributed and right amount of moldable mixture during the shaking step, a higher draw ratio of moldable mixture due to the use of flow-promoting filler material during the molding step, the absence of heat treatment and fumigation after molding step, and a higher density and lighter weight with greater range of thickness of the molded product can be molded.

DETAILED DESCRIPTION OF INVENTION

Figure 1:
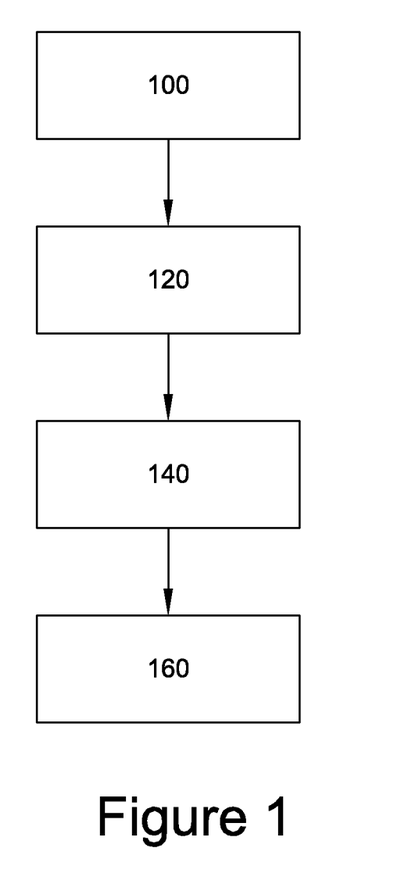
FIG. 1 shows the flow chart of manufacturing a close-molded product.

In FIG. 1, the claimed methods of manufacturing molded products and related parts are mainly arrived by four steps including a providing step (100), a mixing step (120), a shaking step (140) and a compression molding step (160). In the providing step, agricultural fibers provided to form a moldable mixture may be rape straw, rice stalk or a combination of both. In one embodiment, the raw materials of agricultural fiber have to be trimmed to a length ranges from 5 to 10 mm in a trimming step (not shown) prior to mixing with other components to form a moldable mixture. The trimmed raw agricultural fibers are then dried in a drying step (not shown) to have less than 8% moisture content to the total weight of the moldable mixture, preferably have less than 5% moisture content to the total weight of the moldable mixture. The drying step of the raw materials of the agricultural fiber is followed by a weighing step (not shown) to weigh a suitable amount of substantially dry agricultural fiber prior to mixing with other components to form the moldable mixture. In one embodiment, the percentage by weight of the substantially dry agricultural fiber is between 85%-95% to the total weight of the moldable mixture. In the providing step, a binding agent is also provided to form the moldable mixture. In one embodiment, the binding agent is Diisocyanate-diphenylmethane (MDI). Alternatively, the binding agent can be any soy-based binding agent. In one embodiment, soy-based binding agent used in the moldable mixture may be soy flour. The percentage by weight of the binding agent is not more than 5% to the total weight of the moldable mixture. This binding agent is high viscosity, low in moisture content and free of formaldehyde. In the providing step, a flow-promoting filler material is also provided to form the moldable mixture. In one embodiment, the flow-promoting filler material is wheat flour. The flow-promoting filler material is less than 10% by weight to the moldable mixture. In a preferred embodiment, three main materials including agricultural fibers, a binding agent and a flow-promoting filler material are provided in the providing step to form a moldable mixture, but hardening agent, impact modifier, co-solvent and a de-molding agent are not provided in the same providing step. In one embodiment, hardener such as ammonium chloride, de-molding agent such as soya extract, co-solvent such as alcohol, and impact modifier such as palm fibers are not provided in the providing step to form a moldable mixture.

In FIG. 1, after weighing the substantially dry agricultural fiber in a weighing step (not shown), 85%-95% by weight of the substantially dry agricultural fiber such as rape straw, rice stalk or a combination of rape straw and rice stalk is mixed with other components to form a moldable mixture in a mixing step (120). In one embodiment, the mixing step is a two-step mixing step. In the first part of the two-step mixing step, 85%-95% by weight of the substantially dry agricultural fiber is mixed with less than 10% by weight of a flow-promoting filler material such as wheat flour in a mixing machine (not shown). In one embodiment, the mixing machine comes with a horizontal rotating blade (#4 blades mounted on horizontal shaft) and it is rotating at about 20 to 30 rpm. While the agricultural fiber is stirred in the mixing machine, the wheat flour of less than 10% by weight is introduced to the stirring agricultural fiber in the first part of two-step mixing step. In the second part of the two-step mixing step, not more than 5% by weight of a binding agent such as Diisocyanate-diphenylmethane (MDI) or any soy-based binding agent is also introduced to the mixing machine by spraying (not shown). In one embodiment, not more than 5% by weight of MDI is sprayed with a pressure nozzle at a pressure of around 5 to 8 bars into the stirring mixture of agricultural fibers and a flow-promoting filler material. In another embodiment, not more than 5% by weight of soy-based binding agent such as soy flour is sprayed with a pressure nozzle at a pressure of around 5 to 8 bars into the stirring mixture of agricultural fibers and a flow-promoting filler material. In the mixing step, the mixture of agricultural fibers, a flow-promoting filler material and a binding agent is kept stirring until such mixture is blended to form a moldable mixture. In one embodiment, the whole rotating cycle for a mixing step takes less than 3 minutes.

In FIG. 1, upon completion of the mixing step (120), the moldable mixture is ready for feeding the moldable mixture to the mold in a shaking step (140). In the shaking step, the moldable mixture is loaded into an Intermediate Bulk Container (IBC) (not shown) and then discharged through the weighing Hopper (not shown) into a material feeding tray at the material loading station (not shown). The material feeding tray filled with moldable mixture is then transferred from the material loading station to a pressing area (not shown) where compression molding (160) takes place. In one embodiment, the moldable mixture has been shaking throughout the discharging of the moldable mixture from IBC through the weighing hoop into the material feeding tray. In another embodiment, the material feeding tray containing the moldable mixture has also been shaking throughout the loading of the moldable mixture from the material feeding tray to the cavity of the bottom mold at the pressing area where compression molding takes place.

In FIG. 1, after shaking (140) the moldable mixture, the moldable mixture is ready for being compressed in a compression molding step (160). The compression molding step is performed at a single compression stroke. In one embodiment, the compression molding step is carried out at a temperature between 200-230° C. In one embodiment, the mold is heated up through internal heat transfer at a temperature between 200-230° C. The moldable mixture is compressed under a pressure between 0.30 to 0.40 kg/mm² for 1.5 to 2.5 minutes. After compression molding, the molded product is ejected out from the mold and then transferred to a packing area next to the pressing area. The molded product is not subjected to heat treatment and fumigation for killing any living pests after ejecting out from the mold.

Figure 2:
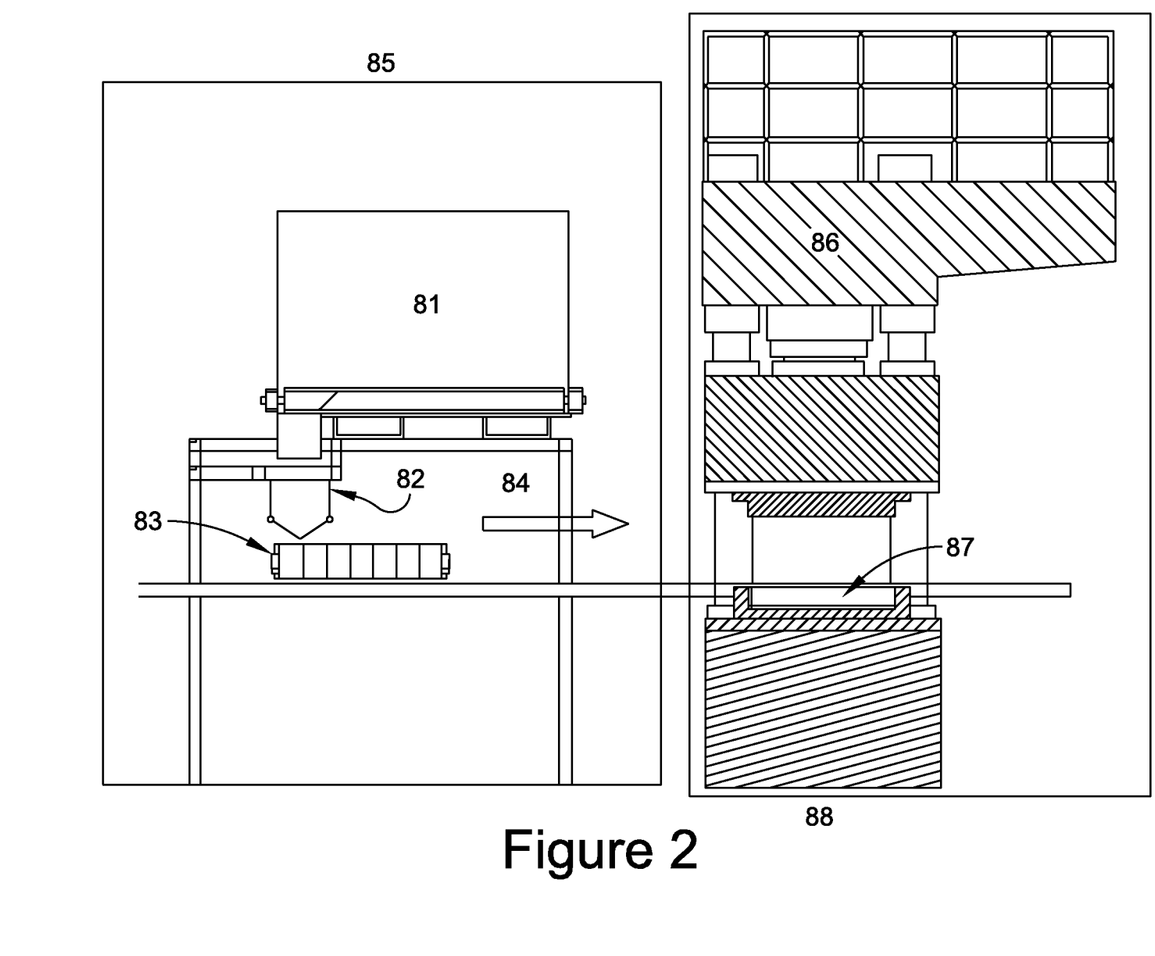
FIG. 2 is an illustration of a device for shaking the moldable mixture throughout the discharging of the moldable mixture from IBC until loading the moldable mixture into a mold.

An example of mixing and shaking the moldable mixture is given in FIG. 2. In this example, the Intermediate Bulk Container (IBC) (81) is placed at the top of a stand-alone material loading station (85). The moldable mixture (not shown) may be discharged through a discharging screw (not shown) into a weighing hopper (82) and then further discharged into a material feeding tray (83) in a row-by-row manner. After the completion of the discharging, the material feeding tray is then transferred along the tray movement path (84) to the pressing area (88) where the compression molding step takes place. The moldable mixture being transferred into the mold (87) at the pressing area is compressed by the hydraulic press (86) into the molded product.

Figure 3:
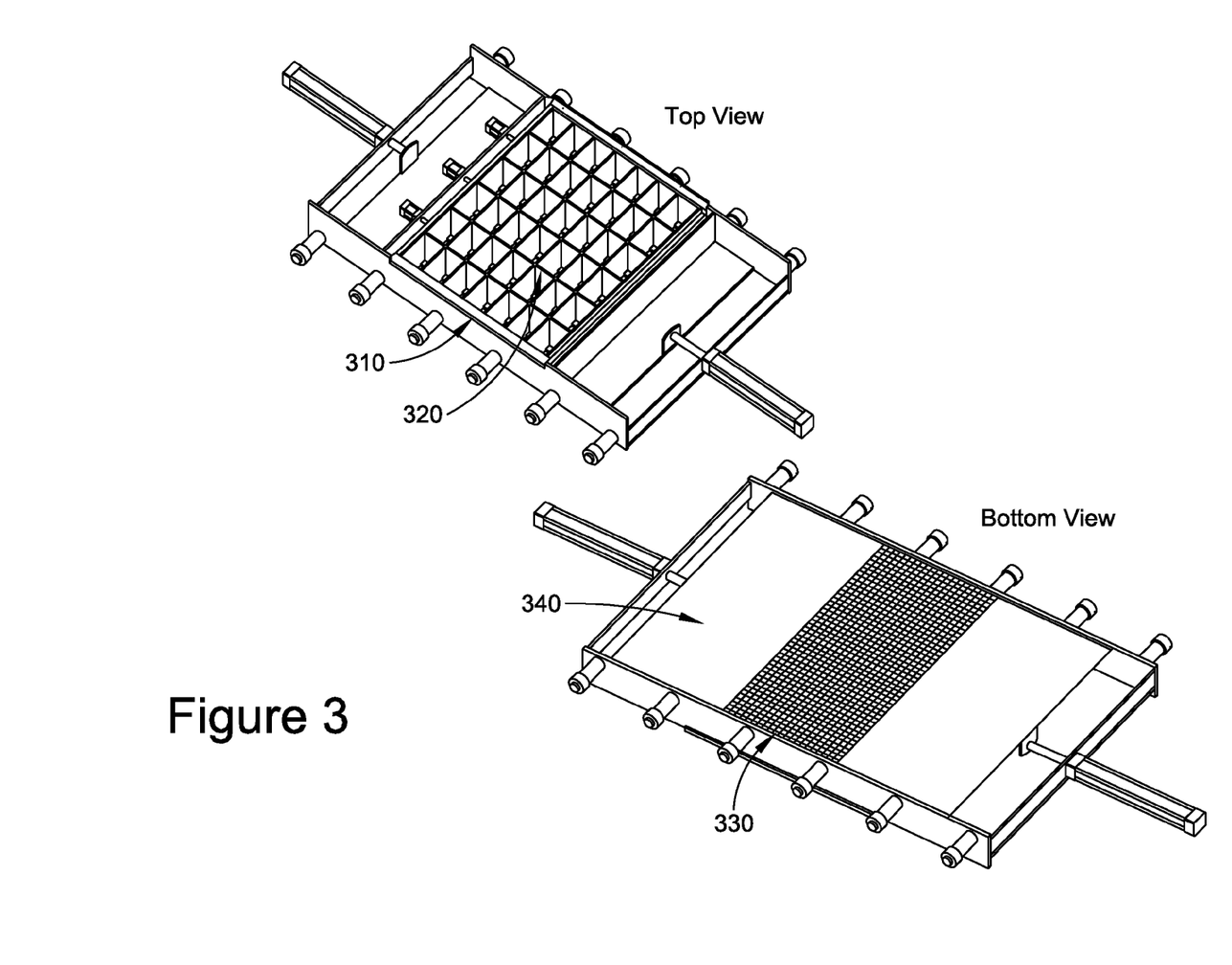
FIG. 3 shows the top and bottom views of the material feeding tray used in the shaking step.

An example of a material feeding tray is given in FIG. 3. In this example, the top view of the material feeding tray (310) shows that it may have an average size of 1.4×1.2×0.2 meter (Length×width×height) and may be divided into 35 to 49 compartments to cater for the loading of different weight of moldable mixture for molding into product with different profile and thickness at different part of the product. Each compartment (320) is designed to take different weight of moldable mixture. This is to ensure that the right amount of the moldable mixture is loaded evenly into the mold at the pre-determined position for optimum molding result and material utilization. It also helps to facilitate the molding process to provide with the maximum draw ratio and enables to mold products with different profile and thickness at different sections of the product. The combination of compartments varies from the complexity and the size of the molded product. In order to facilitate the flowing of the agricultural fibers in a mold during the molding step, the partitions of the material feeding tray are constructed by steel sheet (not shown) in a criss cross manner to form the necessary compartments.

The example as given in FIG. 3 shows that the bottom view of the material feeding tray has a piece of wire mess (330) welded at the bottom face of the steel partitions. The entire steel partition is connected to a rotating rod with a vibrator mounted (not shown). The steel partition together with the welded wire mess can be used for shaking in the horizontal direction throughout the discharging of the moldable mixture, from the material feeding tray to the mold at the pressing area (not shown). The gate (340) mounted at the bottom of the material feeding tray is then opened by sliding movement in the horizontal direction when the material feeding tray is transferred to the mold at the pressing area.

Figure 4:
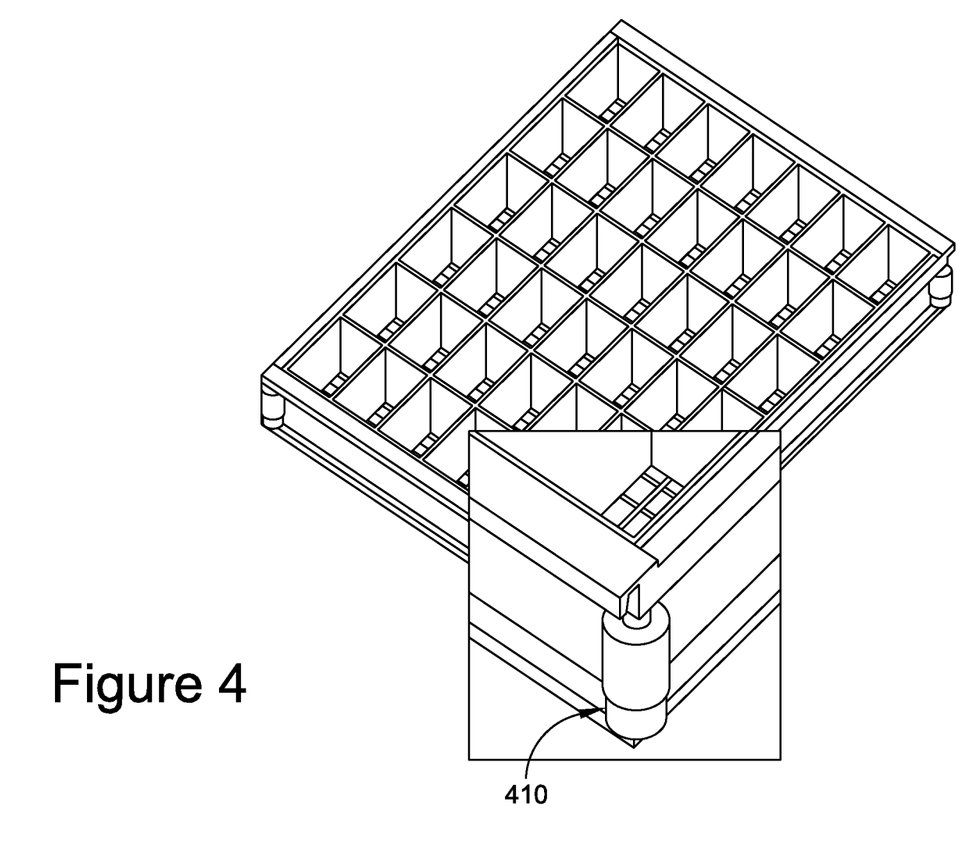
FIG. 4 is an enlarged image of the material feeding tray showing an additional vibrator in each corner for shaking the moldable mixture during the shaking step.

On top of the welded wire mesh, four additional vibrators (410) as shown in FIG. 4 are mounted at the four corners of the material feeding tray which are also shaking concurrently in the vertical direction throughout the discharging and loading of the moldable mixture.

Figure 5:
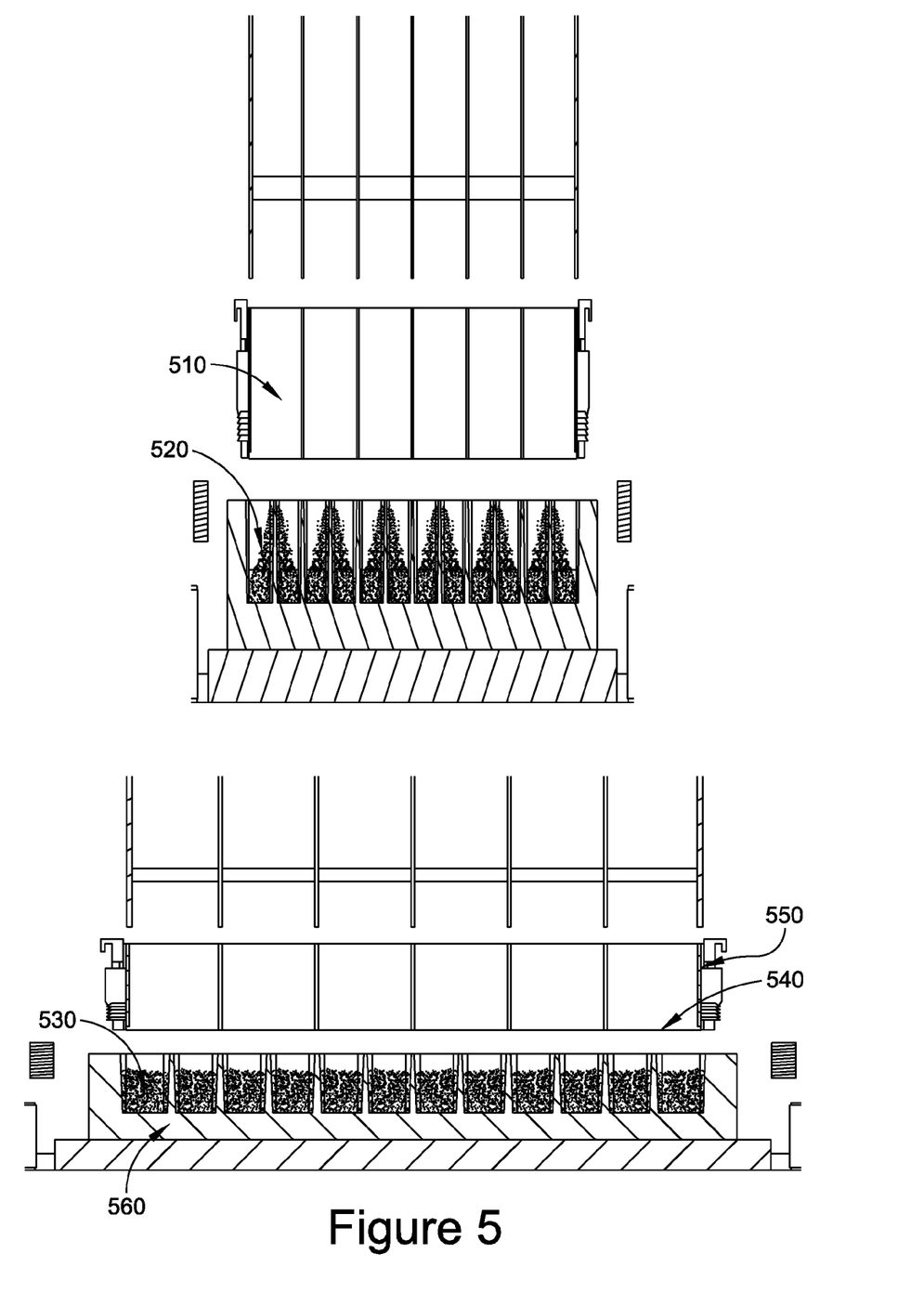
FIG. 5 shows the design of the material feeding tray with shaking features in the present invention (lower part) for loading the moldable mixture to the bottom mold at the pressing area as compared to the design of the conventional material feeding tray (upper part) without shaking features.

In the lower part of FIG. 5, the moldable mixture (530) is discharged into the cavity of the bottom mold (560) in an evenly dispersed manner with the aid of both the horizontal and vertical vibration motions generated by the rotating rod with a vibrator (not shown in FIG. 5) and four additional vibrators at four corners of the material feeding tray (550) as described above prior to the compression molding step. This kind of shaking feature is incorporated in the present invention due to the fact that when using the conventional method, the loading of moldable mixture from the conventional material feeding tray (510) into the bottom mold without any shaking always forms a hump (520). On the other hand, the material feeding (540) of the present invention has to be leveled by four additional vibrators at four corners of the bottom side (550) to enable shaking when loading the moldable mixture from the material feeding tray into the bottom mold at the pressing area. Such feature can achieve the effect of optimum molding results, i.e. minimum molding pressure, minimum material use. Such feature also enables the moldable mixture to flow freely to the desired height which can be determined by the draw ratio. After the moldable mixture is fully loaded into the cavity of the bottom mold, the material feeding tray may be returned to the original position for re-filling.

Figure 6:
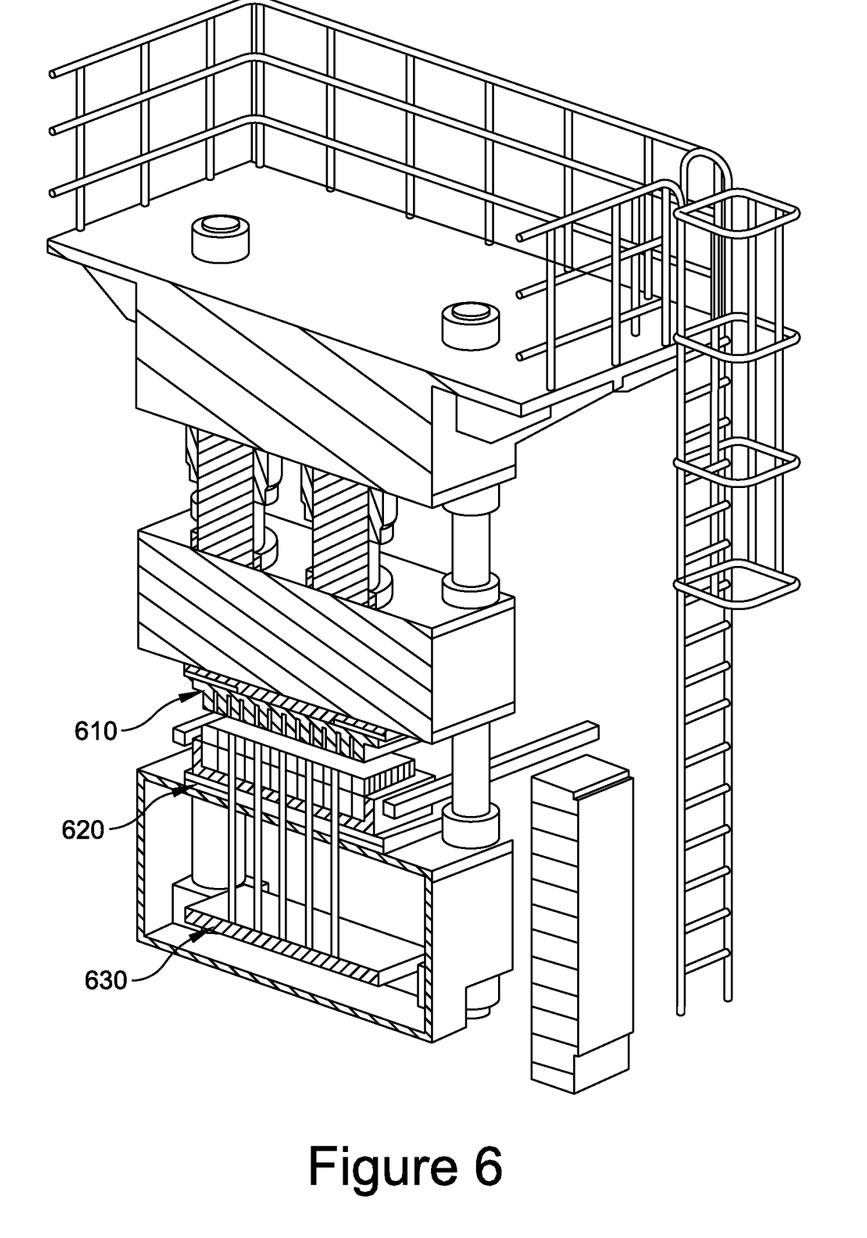
FIG. 6 is an enlarged image of the mold and the hydraulic press at the pressing area in the molding step.

An illustration of a hydraulic ejection system for molding is given in FIG. 6. In this example, the hydraulic ejectors (630) are situated below the bottom mold at the pressing area. In one embodiment, the moldable mixture is molded at a pressing area at a temperature between 200-230° C. Both the top (610) and bottom (620) mold are fitted with various steel pipes (not shown). The thermal oil is electrically heated and circulating through the oil channels inside the mold. Since the mold is heated up through heat transfer within the mold, therefore it can achieve a lower energy loss.

In one embodiment, the moldable mixture is compressed under a pressure between 0.30 to 0.40 kg/mm$^2$ for 1.5 to 2.5 minutes at the pressing area. The compression molding is performed as a single compression stroke. There is no need to open and close the mold repeatedly nor ironing to release excess moisture to prevent possible mold explosion because the moldable mixture of the present invention has relatively low moisture content. After the compression, the molded part is ejected out from the bottom mold with the hydraulic system (630). A mechanical pick and place system (not shown) is incorporated in the material feeding system to pick up the molded part and transfer the molded part to a packing area (not shown) next to the pressing area. Since the molded product has been subjected to high heat and high pressure during the molding process, further heating and fumigation steps for killing living pests in the molded product are not required.

Figure 7:
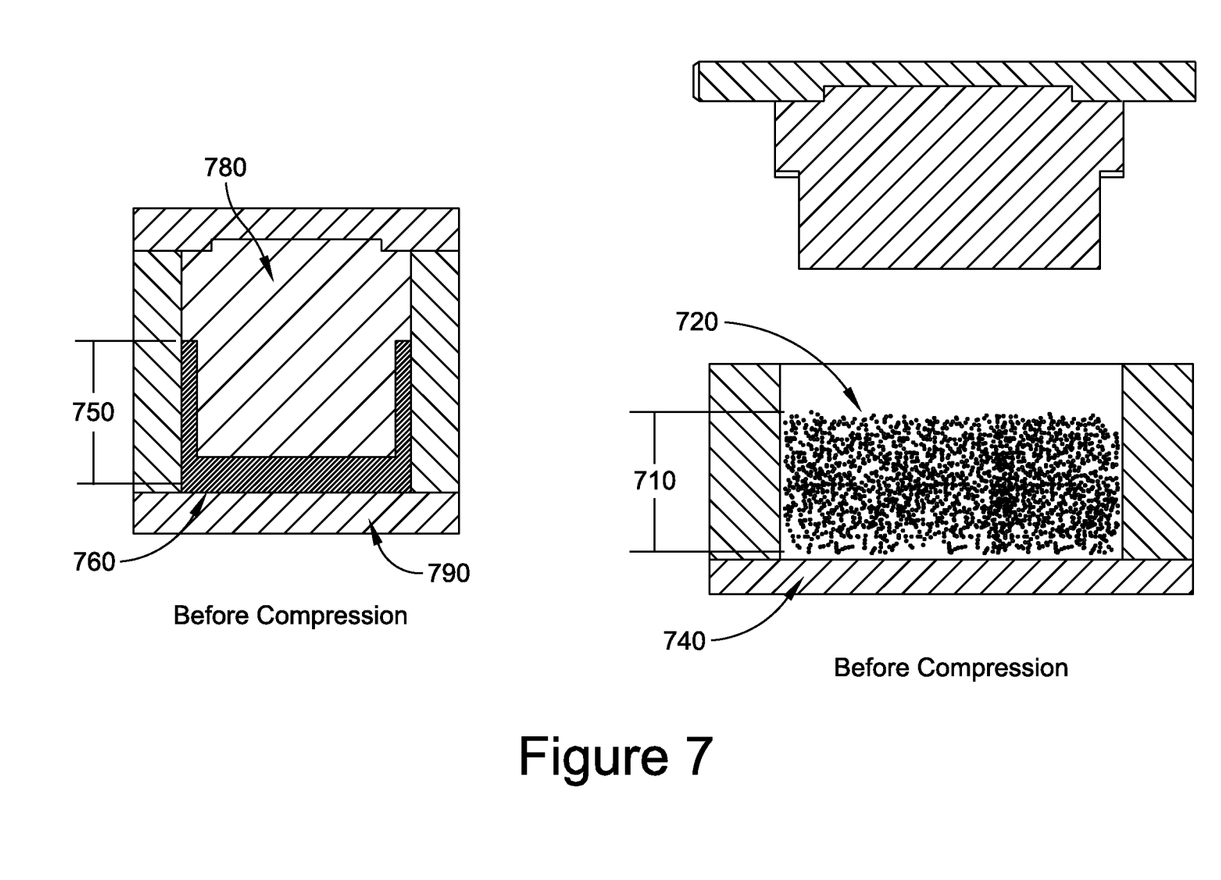
FIG. 7 shows the cross-section of the top and bottom mold with the moldable mixture before and after compression in the molding step.

FIG. 7 illustrates the cross-section of a molding part in the mold before and after the compression in the molding step. The upper part of the figure shows the cross-section of the moldable mixture (720) in the cavity of bottom mold (740) before the compression molding step whereas the lower part of the figure shows the cross-section of part of the molded product (760) in the cavity between the top mold (780) and the lower mold (790) after the compression molding step. In one embodiment, the top mold (780) is pressed on the moldable mixture in the cavity of the bottom mold (790) with a pressure of 0.30 to 0.40 kg/mm$^2$ to form molded product (760). The compression molding for the moldable mixture into part of a molded product is a single compression stroke without the needs of opening and closing the mold repeatedly. In one embodiment, the moldable mixture after the compression flows upwards towards the horizontal molding cavity of the enclosed mold under the temperature between 200-230° C. The height (750) of part of the molded product (760) along the horizontal molded cavity of the enclosed mold can be determined. The draw ratio of the moldable mixture is obtained from dividing the height (750) of the molded part (760) in the horizontal molding cavity of the enclosed mold after compression by the height (710) of moldable mixture (720) in the cavity of bottom mold (740) before compression. Such ratio reflects the upwards flowing ability of the moldable mixture during molding.

Figure 8:
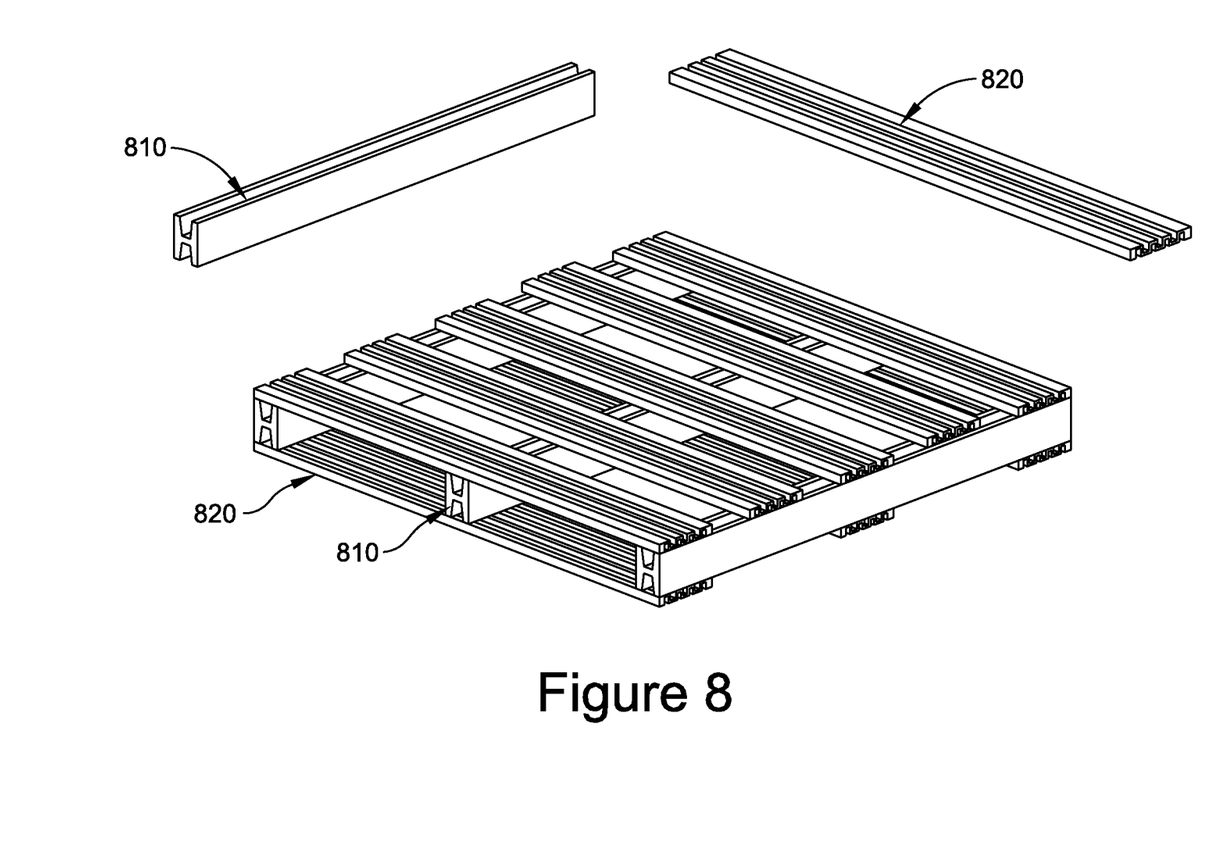
FIG. 8 shows the side-prospective view of a molded pallet of the present invention.

Due to the high draw ratio and high density, the molded part can be corrugated with complex profile such as runner (810) and plank (820) of a pallet (830) as shown in FIG. 8. The molded product is ready for use or can be used repeatedly without any post-heat treatment and fumigation.

While the present invention has been described with examples to preferred embodiments, it will be apparent that other changes and modifications could be made by one skilled in the art, without varying from the scope or spirit of the claims appended hereto.

Industrial Applicability

The present invention provides a moldable mixture and methods of manufacturing molded products and related parts based on the claimed moldable mixture. The claimed moldable mixture can be applied to the field of construction materials and manufacture of molded products such as pallets and related parts. The claimed methods of manufacturing can be applied to making construction products or molded products with better quality.

I claim:

1. A method of manufacturing a molded pallet, the method comprising the steps of:
   providing an agricultural fiber, a binding agent and a flow-promoting filler material;
   mixing said agricultural fiber with said flow-promoting filler material and said binding agent to form a moldable mixture;
   shaking said moldable mixture, including:
   discharging said moldable mixture from a material loading station into a material feeding tray having 35 to 49 compartments to cater for loading of different weights of the moldable mixture and with a shaking motion in a horizontal direction with a mesh screen, and
   transferring said moldable mixture from said material feeding tray to a mold with a shaking motion in a vertical direction with a plurality of vibrators in preparation for compression molding;
   compression molding said moldable mixture in in said mold to form a molded pallet having components with varying shapes, profiles and thicknesses and comprising a I-shaped beam runner, and a corrugated plank.

2. The method of claim 1, wherein said mixing further comprises spraying said binding agent at pressure between 5 to 8 bar into said agricultural fiber with said flow-promoting filler material, wherein said binding agent is Diisocyanate-diphenylmethane with an amount not more than 5% by weight to said moldable mixture.

3. The method of claim 1, wherein said binding agent is a soy-based binding agent with an amount not more than 5% by weight to said moldable mixture.

4. The method of claim 1, wherein said agricultural fiber is at least one agricultural fiber selected from a group consisting of rape straw and rice stalk.

5. The method of claim 1, wherein said agricultural fiber is between 85% to 95% by weight to said moldable mixture.

6. The method of claim 1, wherein said flow-promoting filler material is wheat flour which is less than 10% by weight to said construction molding mixture.

7. The method of claim 1, wherein said mixing takes place in the absence of hardener, impact modifier, co-solvent and de-molding agent.

8. The method of claim 1, wherein said compression molding is performed as a single compression stroke.

9. The method of claim 8, wherein said single compression stroke is performed with a draw ratio from 1 to 10.

10. The method of claim of 1, wherein said compression molding is performed at a temperature from 200 to 230 degree Celsius.

11. The method of claim of 1, wherein said compression molding is performed at a pressure from 0.30 to 0.40 kg/mm$^2$.

* * * * *